United States Patent [19]

Schmid et al.

[11] 4,180,527

[45] * Dec. 25, 1979

[54] PROCESS FOR THE MANUFACTURE OF CRYSTALLINE, CROSSLINKED, ELASTOMERIC EPOXIDE RESINS

[75] Inventors: Rolf Schmid, Gelterkinden; Ursula Kreibich, Riehen, both of Switzerland

[73] Assignee: Ciba-Geigy Corporation, Ardsley, N.Y.

[ * ] Notice: The portion of the term of this patent subsequent to Jul. 18, 1995, has been disclaimed.

[21] Appl. No.: 828,442

[22] Filed: Aug. 29, 1977

Related U.S. Application Data

[63] Continuation-in-part of Ser. No. 680,265, Apr. 26, 1976, abandoned.

[30] Foreign Application Priority Data

Apr. 28, 1975 [CH] Switzerland ................ 5443/75

[51] Int. Cl.$^2$ ............................................. C08L 63/00
[52] U.S. Cl. ..................................... 525/115; 136/89 P; 260/37 EP; 260/40 R; 525/119
[58] Field of Search ........................................ 260/835

[56] References Cited

U.S. PATENT DOCUMENTS 3,641,194  2/1972  Schmid ........................... 260/835
3,739,041  6/1973  Schmid ........................... 260/835
3,937,751  2/1976  Schmid ........................... 260/835
3,979,477  9/1976  Schmid ........................... 260/835
4,101,476  7/1978  Schmid ........................... 260/835

FOREIGN PATENT DOCUMENTS 1931292  1/1970  Fed. Rep. of Germany ........... 260/835
1182728  3/1970  United Kingdom ................... 260/835
1225945  3/1971  United Kingdom ................... 260/835

*Primary Examiner*—Paul Lieberman
*Attorney, Agent, or Firm*—Joseph F. DiPrima

[57] ABSTRACT

The invention relates to the manufacture of crystalline epoxide resins which exhibit a marked crystallite melt temperature. The formation of the crystallites is caused by molecule blocks which are derived from aliphatic polyester-polycarboxylic acids. According to the invention, two aliphatic polyester-polycarboxylic acids (A and B) are reacted under very specific quantitative conditions with epoxide compounds which contain at least 2 epoxide groups and optionally with curing agents. The polyester-polycarboxylic acids A are purely n-aliphatic in character, whereas the polyester-polycarboxylic acids B are not. They contain, for example, neopentyl radicals which are derived from neopentyl alcohol during the ester formation. These crystalline synthetic resins are particularly suitable for use as material for absorbing solar energy in solar energy collectors.

21 Claims, No Drawings

PROCESS FOR THE MANUFACTURE OF CRYSTALLINE, CROSSLINKED, ELASTOMERIC EPOXIDE RESINS

This application is a continuration-in-part application of our pending application Ser. No. 680,265, filed Apr. 26, 1976, now abandoned.

The invention relates to crystalline, crosslinked, elastomeric epoxide resins, in which the flexible and rigid blocks essentially consist of aliphatic molecule chains and which are distinguished by their special morphological properties. In the present document and in accordance with the present invention, a crystalline epoxide resin is to be understood as a product which is usually partially crystalline.

Various epoxide resins, all of which contain, as crystallites, the radicals of a long-chain aliphatic polyester-polycarboxylic acid, are already known. In this connection, British Pat. Nos. 1,164,584 and 1,283,653 should be mentioned in particular. These products are crystalline synthetic resins which, because they can be stretched, exhibit very high elongations at break at room temperature. If they are warmed to a temperature above the crystallisation transition temperature, they then exhibit soft rubbery-elastic properties and have only a low mechanical strength. However, they exhibit a relatively low reversible extensibility and, at the same time, fairly high modulus values. Because of these properties, which manifest themselves in the form of stiffness and brittleness, these resins are less suitable as materials for use together with a material of a different type, for example for laminates with glass, metal, carbon, plastics of a different type, and the like (especially in the form of fibres). Particularly in the case of their use for potting, for example around glass or metal, with which it is not possible to avoid a certain amount of thermal cycling, considerable dilatation stresses result which, when the casting is cooled, lead to a disadvantageous permanent deformation or even to the formation of cracks.

In discussing the prior art, attention is also now drawn to U.S. Pat. No. 3,979,477, which likewise relates to crosslinked epoxide resins in the manufacture of which long-chain aliphatic polyester carboxylic acids, among others, are likewise used. These polyester dicarboxylic acids are either unsubstituted or substituted. If they are unsubstituted, they are distinguished by crystallinity. Polyester dicarboxylic acids of the formula

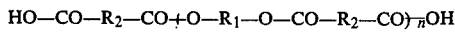

wherein $R_1$ and $R_2$ primarily represent or contain annular molecular redicals, are also additionally used in the manufacture of these crosslinked epoxide resins. In principle, however, $R_1$ and $R_2$ in the above formula can also represent divalent aliphatic radicals, whilst at least one of these two radicals must contain a carbocyclic ot heterocyclic ring or such a ring system. Furthermore, the possible total amount of the aliphatic molecular components in $R_1$ and $R_2$ is greatly restricted. The cumulation thus produced overall of the annular molecular radicals in these polyester dicarboxylic acids causes them to be rigid (non-flexible). The degree of rigidity is so great that a formation of crystallinity of the resultant crosslinked epoxide resins is virtually prevented because of the above-mentioned crystalline long-chain aliphatic dicarboxylic acids. The epoxide resins of U.S. Pat. No. 3,979,477 are therefore virtually amorphous and not crystalline.

The object of the invention is to provide crystalline, elastomeric epoxide resins which, down to relatively low temperatures, do not exhibit these adverse properties of the plastics according to the prior art discussed above. They must, therefore, exhibit a greater reversible extensibility and lower moduli and these properties should be retained up to relatively high temperatures and, at the same time, down to temperatures which are as low as possible. By means of these desired properties it would then be possible to avoid heat-dependent dilatation stresses in connection with the other type of material in a laminate and to avoid increased formation of cracks which is associated therewith.

The subject of the invention is a process for the manufacture of crystalline, crosslinked, elastomeric epoxide resins, which is characterised in that epoxide compounds, containing two or more epoxide groups, are reacted (a) with polyester-polycarboxylic acids A which essentially contain segments of the formula I

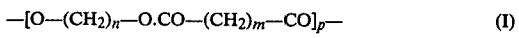

in which n and m are identical or different and denote 2 or a higher number than 2, and to which the condition n+m=6 to 30 applies, and in which p denotes a number from 2 to 40 which, however, is sufficiently large that the segment contains at least 30 —CH$_2$— groups, and (b) with polyester-polycarboxylic acids B which essentially contain segments of the formula II

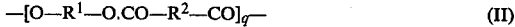

in which $R^1$ and $R^2$ are identical or different and denote an alkylene radical with at least 2 C atoms in the chain and in which, per O bridge, an average of at least 3.5 and at most 30 C atoms, without taking into account the C atoms of the —CO.O— radicals, are present in the chain, and wherein the radicals $R^1$ and $R^2$ together contain at least one alkyl group cycloalkyl group or aryl group as a substituent for one H atom, and in which q denotes a number from 2 to 40, which, however, is sufficiently large that the segment contains at least 30 C atoms, without taking into account the C atoms of the —CO.O— radicals, in the chain, and (c) if appropriate, with curing agents C, and, if appropriate, in the presence of accelerators, in a ratio such that 0.5 to 1.2 equivalents of polyester-polycarboxylic acid are present per equivalent of epoxide compound, that 1/10 to 9/10 of these 0.5 to 1.2 equivalents are attributable to the polyester-polycarboxylic acid A and the remaining 9/10 to 1/10 to the polyester-polycarboxylic acid B, and that up to 0.6 equivalent of curing agent C is present per equivalent of epoxide compound, with the proviso that, in the cases in which only difunctional epoxide compounds and difunctional polyester-polycarboxylic acids A and B are employed, the epoxide groups must be present in excess and the reaction with a curing agent C is essential.

Preferably, the condition n+m=6 to 24 applies to the formula I.

In the epoxide resins obtained according to the invention, the radicals of the polyester-polycarboxylic acids A represent the rigid molecule blocks and are in the form of crystallites with crystallite melting points between 40° and 120° C. The radicals of the polyester-polycarboxylic acids B, on the other hand, are incorporated as flexible blocks in the crosslinked molecule and in practice these form the matrix in which the crystallites are incorporated. It is particularly surprising that a relatively large proportion of the polyester-polycarboxylic acids B, that is to say up to 9/10 of the total amount of polyester-polycarboxylic acid employed, can be incorporated in the crosslinked epoxide resin without this resulting in crystallisation being prevented.

Preferably, the procedure followed according to the invention is such that 0.7 to 1.2, especially 0.9 to 1.1, equivalents of polyester-carboxylic acid are present per equivalent of epoxide compound.

The polyester-polycarboxylic acids A and B used in the reaction can for practical purposes be manufactured by the same basic process, by esterification of corresponding aliphatic dialcohols and aliphatic dicarboxylic acids or by esterification between suitable derivatives of these alcohols and dicarboxylic acids, such as, for example, the anhydrides, acid chlorides and the like. The dicarboxylic acids must be present in excess.

Where minor amounts of aliphatic polyalcohols with at least 3 OH groups, especially glycerol, are also used, branched, that is to say at least 3-functional, polyester-polycarboxylic acids A and B are obtained. The use of the latter in the reaction according to the invention is also a preferred form of the invention. Branched polyester-polycarboxylic acids A and B which are obtained if small amounts of polycarboxylic acids, or their anhydrides, with at least 3 carboxyl groups (such as, for example, trimellitic acid) are also present during the manufacture of the polyester-polycarboxylic acids, are equally suitable for the reaction according to the invention.

However, it is also possible to employ branched polyester-polycarboxylic acids A and B, which are obtainable by esterification of the terminal OH groups of long-chain polyester-polyols, especially of polyester-diols, with polycarboxylic acids which contain at least 3—CO.OH groups, such as, for example, trimellitic acid, or with corresponding anhydrides.

When manufacturing polyester-polycarboxylic acids B it is necessary, in contrast to the manufacture of polyester-polycarboxylic acids A, for either the dicarboxylic acids (or the derivatives thereof which are suitable for forming the ester) or the diols (or the derivatives) or for both reactants to contain at least one alkyl, cycloalkyl or aryl group as a substituent for one H atom. Preferred reactant to be mentioned here in this connenction is neopentylglycol.

The basic rules for the manufacture of the polyester-polycarboxylic acids A and B used according to the present invention in other respects entirely correspond to those which have to be observed for the manufacture of the "long-chain dicarboxylic acids" employed according to British Pat. No. 1,164,584, and which are described in detail in this British patent. Further data on the basic principles of the manufacture of such long-chain, aliphatic polyester-polycarboxylic acids are also to be found in a publication by Hans Batzer et al. in "Die Angewandte Makromolekulare Chemie" 1973, page 349–412.

Examples of suitable polyester-polycarboxylic acids A are those based on the following polyalcohols and polycarboxylic acids:

16 mols of adipic acid—15 mols of hexane-1,6-diol
21 mols of succinic acid—20 mols of butane-1,4-diol
11 mols of sebacic acid—10 mols of hexane-1,6-diol
Glycerol—succinic acid—butanediol (1:24:21)
11 mols of succinic acid—10 mols of butanediol
11 mols of dodecanedicarboxylic acid—10 mols of hexanediol
11 mols of dodecanedicarboxylic acid—10 mols of butanediol
11 mols of dodecanedicarboxylic acid—10 mols of propane-1,3-diol
7 mols of dodecanedicarboxylic acid—6 mols of hexanediol
7 mols of dodecanedicarboxylic acid—6 mols of dodecanediol
7 mols of sebacic acid—6 mols of dodecanediol
11 mols of sebacic acid—6 mols of dodecanediol
Trimethylhexanediol—succinic anhydride—butanediol (1:30:27)
11 mols of dodecanedicarboxylic acid—10 mols of ethylene glycol
5 mols of decanedicarboxylic acid—4 mols of docecanediol
11 mols of decanedicarboxylic acid—10 mols of hexanediol Examples of suitable polyester-polycarboxylic acids B are those based on the following polyalcohols and polycarboxylic acids:

11 mols of sebacic acid—10 mols of neopentylglycol
8 mols of adipic acid—7 mols of neopentylglycol
13 mols of adipic acid—12 mols of neopentylglycol
8 mols of adipic acid—7 mols of trimethylhexanediol
8 mols of trimethyladipic acid—7 mols of neopentylglycol
14 mols of adipic acid—13 mols of neopentylglycol
Glycerol—adipic acid—butanediol—neopentylglycol (1:9:3:3)
Trimethylhexanediol—adipic acid—hexanediol—neopentylglycol (1:8:2:3)
14 mols of succinic acid—13 mols of neopentylglycol As epoxide compounds containing two or more epoxide groups it is possible to employ practically all the polyepoxy compounds known, to those skilled in the art, from publications and patent specifications. According to the invention, one or more different epoxide compounds can be reacted. Triglycidyl isocyanurate and triglycidyl compounds which contain one or more hydantoin groups and/or dihydrouracil groups, especially epoxide compounds of the formula III

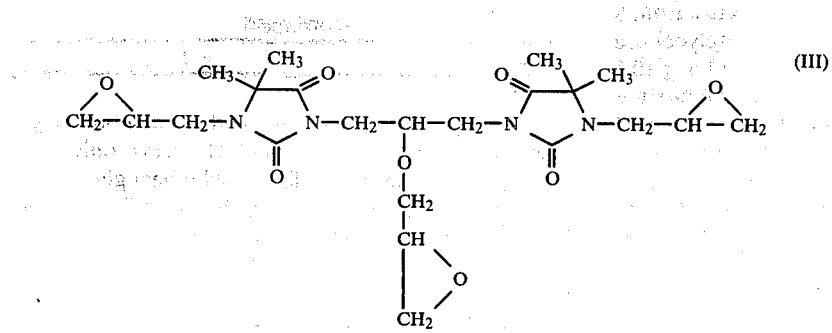

(III)

are particularly suitable.

In principle, the reaction according to the invention can be carried out either in 1 stage or in several stages. If the epoxide compounds used have at least 3 epoxide groups, and polyester-dicarboxylic acids A and B are employed, it is possible, for example, to carry out the reaction in 1 stage, that is to say to start from a reaction mixture which contains all the reactants simultaneously. It is possible to proceed in exactly the same way (that is to say in 1 stage) if, instead of the dicarboxylic acids, polyester-polycarboxylic acids A and B which have at least 3 carboxyl groups are employed. In the converse case, that is to say when using polyester-carboxylic acids A and B containing at least 3 carboxyl groups, and using diepoxy compounds, working in 1 stage is again possible and is the normal method of reaction for such cases.

If only diepoxy compounds and only polyester-dicarboxylic acids are employed, it is only possible to work in one stage if an excess of epoxide compounds is used and at the same time a polycarboxylic acid anhydride is added.

In the multi-stage method, an adduct containing epoxide groups is initially manufactured, in a first stage, from the epoxide compounds and the polyester-polycarboxylic acids A and/or B, preferably using 0.5 to 1 equivalent of polyester-polycarboxylic acid per 2 equivalents of epoxide compounds. In a second reaction stage, the crosslinking is then carried out, by reaction of the adducts with the remainder of the polyester-polycarboxylic acids A and/or B. It is also possible to proceed by carrying out the crosslinking in the second stage in the presence of customary curing agents. It is also possible additionally to add yet further monomeric epoxide compounds and correspondingly larger amounts of curing agents.

As customary curing agents for epoxide resins it is possible to employ all the substances which are described in the numerous publications and patents relating to epoxide resins. Inter alia, the following substances may be listed here: compounds with amino groups, polyalcohols, polycarboxylic acids and their anhydrides, acid amides, polyesters, phenol-formaldehyde condensates and amino-resin precondensates. Tertiary amines and imidazoles may be mentioned as examples of suitable accelerators.

The reaction according to the invention is preferably carried out in the melt. For this, preferably temperatures of between 50° and 200° C. and reaction times of more than 1 hour and up to about 20 hours are required. In principle, the reaction according to the invention can also be carried out in solution.

Before or during the reaction, a blowing agent for the manufacture of foams can also be added.

The crystalline, crosslinked plastic products are as a rule manufactured with simultaneous shaping, to give castings, foamed articles, pressings, lacquer films, laminates, adhesive bonds and the like.

Of course, further customary additives, such as fillers, reinforcing agents, mould release agents, agents to protect against aging, flameproofing substances, dyestuffs or pigments, can be added to the moulding compositions.

Suitable fillers or reinforcing agents are fibrous or pulverulent inorganic or organic substances. Quartz powder, aluminium oxide trihydrate, mica, aluminium powder, iron oxide, ground dolomite, chalk powder, gypsum, slate powder, unburnt kaolin (bolus), burnt kaolin, glass fibres, boron fibres, and asbestos fibres may be mentioned. A content of materials, in the form of fibres and powders, which assist the heat conductivity can prove particularly advantageous. Examples of such materials are metals (for example aluminium powder), carbon, such as carbon black and graphite in powder form, and carbon fibres.

For the purpose of optimum and accelerated development of the crystal structure of the polymers it is also advisable to add nucleating agents, such as phthalocyanines, carbon black, α-naphthoic acid or the like.

The epoxide resins which can be manufactured according to the invention can also be used, apart from for the manufacture of mouldings and laminates with glass, metal or the like, for the manufacture of foamed articles.

A particular use for the new epoxide resins is as material which absorbs solar energy in collectors for the storage of solar energy. In such solar collectors, very severe thermal cycling arises, which, in the collectors of the state of the art, can lead, as a result of the different materials having different coefficients of thermal expansion, to dilation stresses, deformations and the formation of cracks. When the epoxide resins manufactured according to the invention are used, for example, as a potting material for metallic tubes and fins, such as are used in heat exchangers, these disadvantages do not arise.

For this special application, the crystalline, crosslinked, elastomeric epoxide resins are preferably dyed black (with at most up to 20% by weight of colorant, preferably carbon black).

The crystalline, crosslinked, elastomeric epoxide resins which can be manufactured by the process according to the invention are also a further subject of the invention.

EXAMPLE 1

77 g (0.05 equivalent) of an acid polyester prepared, by the melt process, from 21 mols of succinic anhydride and 20 mols of butanediol and 35 g (0.05 equivalent) of an acid polyester prepared, by the melt process, from 8 mols of adipic acid and 7 mols of neopentylglycol are warmed to 120° C. and mixed well with 11.0 g (0.1 equivalent) of triglycidyl isocyanurate and the mixture is poured into Anticorodal moulds which have internal dimensions of 150×150×1 mm, have been treated with a silicone mould-release agent and have been pre-warmed to 140° C. After removing the air, the mixture is cured in vacuo for 16 hours at 140° C. Crystalline, soft and tough mouldings are obtained, for which the following characteristics are determined:

| | |
|---|---|
| Tensile strength according to VSM 77,101 (moulding No. 1)* | = 7.3 N/mm$^2$ |
| Elongation at break according to VSM 77,101 | = 350% |
| Crystallite melting point ($T_m$)** | = 100° C. |

*The mouldings are punched from the 1 mm thick sheet using a punching tool. (The tensile test also corresponds to ISO R 527)
**Determined with a differential scanning calorimeter (heating rate = 10°/minute)

EXAMPLE 2

52.6 g (0.02 equivalent) of an adduct obtained from 2.0 equivalents of tetrahydrophthalic acid diglycidyl ester and 1.0 equivalent of an acid polyester obtained from 21 mols of succinic anhydride and 20 mols of butanediol, together with 1.6 g (0.01 equivalents) of hexahydrophthalic acid diglycidyl ester and 8.3 g (0.01 equivalent) of an adduct obtained from 2.5 equivalents of 3',4'-epoxyhexahydrobenzal-3,4-epoxycyclohexane-1,1-dimethanol and 1.0 equivalent of an acid polyester obtained from 11 mols of sebacic acid and 10 mols of neopentylglycol, are warmed to 130° C. The mixture is mixed well with 10.6 g (0.04 mol) of dodecenylsuccinic anhydride and several drops of dimethylbenzylamine and is cast and cured analogously to Example 1. Mouldings with the following characteristics are obtained:

| | |
|---|---|
| Tensile strength | = 13.8 N/mm$^2$ |
| Elongation at break | = 85% |
| Yield stress | = 13.1 N/mm$^2$ |
| Elongation up to the yield point | = 29% |
| $T_m$ | = 95° C. |

Without the addition of the sebacic acid-neopentylglycol polyester adduct, an elongation up to the yield point of less than 10% is measured at a $T_m$ value of 98° C. The main advantage of the new block copolymers is thus that their reversible extensibility is increased several fold at about the same crystalline melting point.

EXAMPLE 3

155 g (0.1 equivalent) of an acid polyester obtained from 11 mols of sebacic acid and 10 mols of hexanediol and 4.6 g (0.03 equivalent) of hexahydrophthalic anhydride are warmed to 100° C. and mixed well with 165 g (0.13 equivalent) of an adduct obtained from 100 parts by weight of an acid polyester obtained from 8 mols of adipic acid and 7 mols of neopentylglycol and 50 parts by weight of a bisphenol A diglycidyl ether with an epoxide equivalent weight of 185 and the mixture is processed, and cured, analgously to Example 1. Mouldings with the following characteristics are obtained:

| | |
|---|---|
| Tensile strength | = 10.8 N/mm$^2$ |
| Elongation at break | = 690% |
| Stress at the yield point | = 5.0 N/mm$^2$ |
| Elongation at the yield point | = 30% |
| $T_m$ | = 58° C. |

An analogous experiment without the addition of the adipic acid-neopentylglycol adduct (using only 0.13 equivalent of bisphenol A diglycidyl ether) gives a $T_m$ value of 59° C. In this case also, the flexibility (reversible deformability) is increased, whilst maintaining the crystallite melting point, by adding an amorphous polyester.

EXAMPLE 4

76.7 g (0.1 equivalent) of a branched (trivalent) polyester, prepared from glycerol, succinic anhydride and butanediol and having an acid equivalent weight of 767, are melted and warmed to 110° C. and then mixed well, at this temperature, with 127 g (0.1 equivalent) of the adipic acid-polyester adduct described in Example 3 and the mixture is processed, and cured, analogously to Example 1. Mouldings with the following characteristics are obtained:

| | |
|---|---|
| Tensile strength | = 4.9 N/mm$^2$ |
| Elongation at break | = 179% |
| $T_m$ | = 61° C. |

EXAMPLE 5

When 146 g (0.1 equivalent) of a branched polyester obtained from glycerol, succinic anyhydride and butanediol and having an acid equivalent weight of 1,460 are used in place of the shorter-chain polyester, mouldings with the following characteristics are obtained analogously to Example 4:

| | |
|---|---|
| Tensile strength | = 13.4 N/mm$^2$ |
| Elongation at break | = 588% |
| $T_m$ | = 77° C. |

EXAMPLE 6 (use in solar collectors)

259 g (0.24 equivalent) of an acid polyester obtained from 11 mols of succinic anhydride and 10 mols of butanediol and 165 g (0.24 equivalent) of an acid polyester obtained from 8 mols of adipic acid and 7 mols of neopentylglycol were warmed to 120° C. and mixed well with 15 g of carbon black, 2.6 g of a light stabiliser (a p-tert.-butylphenol derivative) and 80 g (0.48 equivalent) of the triglycidyl compound of the formula III and the mixture is processed, and cured, analogously to Example 1. However, in this case an Anticorodal mould having a thickness of 10 mm was used. The mould also contained a 130 cm long copper spiral, but no lamellae. After curing, a black collector which was tough at room temperature and had a crystallite melting point of 91° C. was obtained.

Three collector panels manufactured in this way were arranged in series, connected together and exposed to the sun. A separate vessel containing 700 cm$^3$ of water at 18° C. was warmed by means of a copper spiral. After three hours, the water temperature was 71° C., whilst the circulating water had a temperature of 74° C.

(The test was carried out on 21.2.1975 in Basel).

We claim:

1. Process for the manufacture of crystalline, crosslinked, elastomeric epoxide resins, characterised in that epoxide compounds, containing two or more epoxide groups, are reacted (a) with polyester-polycarboxylic acids A which essentially contain segments of the formula I $$-[O-(CH_2)_n-O.CO-(CH_2)_m-CO]_p- \qquad (I)$$

in which n and m are identical or different and denote 2 or a higher number than 2, and to which the condition n+m=6 to 30 applies, and in which p denotes a number from 2 to 40 which, however, is sufficiently large that the segment contains at least 30 —CH$_2$— groups, and (b) with polyester-polycarboxylic acids B which essentially contain segments of the formula II $$-[O-R^1-O.CO-R^2-CO]_q- \qquad (II)$$

in which R$^1$ and R$^2$ are identical or different and denote an alkylene radical with at least 2 C atoms in the chain and in which, per O bridge, an average of at least 3.5 and at most 30 C atoms, without taking into account the C atoms of the —CO.O— radicals, are present in the chain, and wherein the radicals R$^1$ and R$^2$ together contain at least one alkyl group as a substituent for one H atom, and in which q denotes a number from 2 to 40, which, however, is sufficiently large that the segment contains at least 30 C atoms, without taking into account the C atoms of the —CO.O— radicals, in the chain, and (c) if appropriate, with curing agents C, and, if appropriate, in the presence of accelerators, in a ratio such that 0.5 to 1.2 equivalents of polyester-polycarboxylic acid are present per equivalent of epoxide compound, that 1/10 to 9/10 of these 0.5 to 1.2 equivalents are attributable to the polyester-polycarboxylic acid A and the remaining 9/10 to 1/10 to the polyester-polycarboxylic acid B, and that up to 0.6 equivalent of curing agent C is present per equivalent of epoxide compound, with the proviso that, in the cases in which only difunctional epoxide compounds and difunctional polyester-polycarboxylic acids A and B are employed, the epoxide groups must be present in excess and the reaction with a curing agent C is essential.

2. Process according to claim 1, characterised in that the reactants are reacted in a ratio such that 0.7 to 1.2, preferably 0.9 to 1.1, equivalents of polyester-polycarboxylic acid are present per equivalent of epoxide compound.

3. Process according to claim 1, characterised in that the reaction is preferably carried out for 1 to 20 hours in the melt at temperatures between 50° and 200° C.

4. Process according to claim 1, characterised in that a single epoxide compound is reacted.

5. Process according to claim 1, characterised in that several epoxide compounds are reacted.

6. Process according to claim 1, characterised in that the epoxide compounds employed are those of the group comprising triglycidyl isocyanurate and triglycidyl compounds which contain one or more hydantoin groups and/or dihydrouracil groups, especially the epoxide compound of the formula III

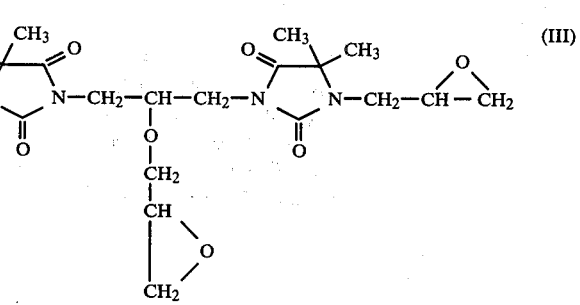

7. Process according to claim 1, characterised in that the polyester-polycarboxylic acids B which are employed are those which contain, as R$^1$ in formula II, the radical $$-CH_2-\underset{\underset{CH_3}{|}}{\overset{\overset{CH_3}{|}}{C}}-CH_2-$$

8. Process according to claim 1, characterised in that polyester-dicarboxylic acids are employed as polyester-polycarboxylic acids A and/or B.

9. Process according to claim 1, characterised in that the polyester-polycarboxylic acids A and/or B which are employed are those which contain at least 3 carboxyl groups.

10. Process according to claim 1, characterised in that at least one adduct containing epoxide groups is manufactured, in a 1st stage, from the epoxide compounds and the polyester-polycarboxylic acids A and/or B, preferably using 0.5 to 1 equivalent of polyester-polycarboxylic acid per 2 equivalents of epoxide compounds, and, in a second stage, is crosslinked with the remaining polyester-polycarboxylic acids and/or curing agents, optionally after the addition of further epoxide compounds.

11. Process according to claim 1, characterised in that the polyester-polycarboxylic acids A and/or B employed are preferably polyester-dicarboxylic acids and the epoxide compounds employed are those containing at least 3 epoxide groups.

12. Process according to claim 1, characterised in that the polyester-carboxylic acids A and/or B employed are those containing at least 3 carboxyl groups, preferably polyester-tricarboxylic acids and/or polyester-tetracarboxylic acids, and the epoxide compounds employed are preferably diepoxide compounds.

13. Process according to claim 11 or 12, characterised in that the reaction is carried out using a ratio such that approximately 1 equivalent of polyester-carboxylic acid is present per equivalent of epoxide compound and in that no curing agent C is employed.

14. Process according to claim 11 or 12, characterised in that the reaction is carried out using an excess of epoxide groups, compared with the —CO.OH groups of the polyester-polycarboxylic acids, and that a curing agent is also used, preferably in an amount which is required for the crosslinking reaction of the excess epoxide groups.

15. Process according to claim 1, characterised in that the polyester-polycarboxylic acids A and B employed are polyester-dicarboxylic acids and the epoxide compounds employed are those containing 2 epoxide groups.

16. Process according to claim 15, characterised in that the reaction is carried out in a single stage using a ratio such that approximately 0.6 to 0.9 equivalent of polyester-carboxylic acid is present per equivalent of epoxide compound and in that a carboxylic acid anhydride is also used, preferably in an amount which is required for the crosslinking reaction of excess epoxide groups, as the curing agent.

17. Process according to claim 15, characterised in that at least one adduct containing epoxide groups is manufactured, in a first stage, from the epoxide compounds and the polyester-polycarboxylic acids A and/or B, preferably using 1 equivalent of polyester-polycarboxylic acid per 2 equivalents of epoxide compound, and, in a second stage, is crosslinked by reaction with customary curing agents.

18. Process according to claim 1, characterised in that nucleating agents, preferably phthalocyanines and/or α-naphthoic acid, are added to the reaction mixture, before or during the reaction.

19. Process according to claim 1, characterised in that fillers, preferably substances which assist the heat conductivity, such as aluminium, carbon black and graphite, are added to the reaction mixture before or during the reaction.

20. Crystalline, crosslinked, elastomeric epoxide resins manufactured by the process according to claim 1.

21. A solar collector comprising the epoxide resins of claim 20 as the material which absorbs solar energy.

* * * * *